US006603850B1

(12) United States Patent
Stahl et al.

(10) Patent No.: US 6,603,850 B1
(45) Date of Patent: Aug. 5, 2003

(54) TELEPHONE LINE ROLLOVER SERVICE FOR ATM/ADSL BASED SYSTEMS

(75) Inventors: Thomas Anthony Stahl, Indianapolis, IN (US); John William Richardson, Hamilton, NJ (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 10/043,685

(22) Filed: Jan. 11, 2002

(51) Int. Cl.[7] .......................... H04L 12/56; H04M 7/00
(52) U.S. Cl. ................. 379/221.02; 370/356; 370/389; 379/221.14; 379/240
(58) Field of Search .................... 370/352, 356, 370/389; 379/219, 220.01, 221.01, 221.02, 221.14, 240, 242

(56) References Cited

U.S. PATENT DOCUMENTS

| | | | | |
|---|---|---|---|---|
| 6,075,784 A | * | 6/2000 | Frankel et al. ............... | 370/356 |
| 6,286,049 B1 | * | 9/2001 | Rajakarunanayake et al. .......................... | 709/227 |
| 6,298,123 B1 | * | 10/2001 | Nolting et al. ............... | 379/111 |
| 6,333,931 B1 | * | 12/2001 | LaPier et al. ................ | 370/385 |
| 6,374,102 B1 | * | 4/2002 | Brachman et al. .......... | 455/422 |
| 6,404,763 B1 | * | 6/2002 | Renucci et al. ............. | 370/352 |
| 6,466,573 B1 | * | 10/2002 | Renucci ...................... | 370/352 |
| 6,493,337 B1 | * | 12/2002 | Stevenson, III ............. | 370/352 |
| 6,512,762 B1 | * | 1/2003 | Renucci et al. ............. | 370/352 |
| 6,535,730 B1 | * | 3/2003 | Chow et al. ................. | 455/416 |
| 2002/0009099 A1 | * | 1/2002 | D'Onofrio ................... | 370/467 |
| 2002/0071544 A1 | * | 6/2002 | Smith et al. ................. | 379/242 |
| 2002/0164009 A1 | * | 11/2002 | Kitayama .................... | 379/219 |

* cited by examiner

Primary Examiner—Harry S. Hong
(74) Attorney, Agent, or Firm—Joseph S. Tripoli; Harvey D. Fried; Joseph J. Kolodka

(57) ABSTRACT

A method and system for providing rollover service from a competitive local exchange carrier (CLEC) is disclosed. A routing table is provided which includes call reference values stored within a local bypass system. An incoming call is checked against the call reference values to determine if a call reference value of the incoming call is associated with a grouping of call reference values. The call is connected to a destination associated with a next available call reference value in the grouping using a network control system located within the local bypass system.

14 Claims, 2 Drawing Sheets

200
TELEPHONE LINE ROLLOVER SERVICE FOR ATM/ADSL BASED SYSTEMS

FIELD OF THE INVENTION

The present invention generally relates to network communications and, more particularly, to a method and system for providing rollover service in asynchronous transfer mode (ATM) digital subscriber line (DSL) systems.

BACKGROUND OF THE INVENTION

Regional Bell operating company (RBOC) is a term describing one of the U.S. regional telephone companies (or their successors) that were created as a result of the breakup of AMERICAN TELEPHONE AND TELEGRAPH COMPANY® (AT&T®, known also as the Bell System) by a U.S. Federal Court consent decree on Dec. 31, 1983. The seven original regional Bell operating companies were AMERITECH®, BELL ATLANTIC®, BELLSOUTH®, NYNEX®, PACIFIC BELL®, SOUTHWESTERN BELL®, AND US WEST®. Each of these companies owned at least two Bell operating companies. The BOCs were given the right to provide local phone service while AT&T® was allowed to retain its long-distance service. The RBOCs and their constituent BOCs are part of the class of local exchange carriers (LECs).

In addition to the RBOCs, there are more than 100 other franchised local telephone companies classed as local exchange carriers. Competitive local exchange carriers (CLECs) are additional companies allowed to compete with the LECs. These include AT&T in some localities and power companies. An interexchange carrier is a long-distance carrier that carries traffic between LECs.

CLECs try to deliver service, which is priced below that of the dominant ILEC (Incumbent Local Exchange Carrier) to remain competitive, but also try to deliver service, which is superior in terms of value, customer responsiveness, and flexibility. Additional service features and incentives are often employed by CLECs to remain competitive with ILECs Rollover is a feature commonly provided by ILECs to business customers. In this feature, an incoming call is rolled over to the next available central office (CO) line connected to the phone customer's business. This permits customers to call a single phone number at the business, and the call is automatically routed to the first available line. These lines have their own phone number associated with them, but it is not necessary to know the phone numbers of the additional lines.

Typically, the customer would have a business phone system (e.g., key system) hooked to the many CO lines with attendants answering the incoming calls (e.g., customer service offices). The desired rollover hunt group is specified by the business owner. The ILEC charges for this service. The rollover feature is typically implemented in the CO switch (e.g., 5ESS) and is operated by the ILEC.

Therefore, a need exists for a method and system, which provides support for a rollover feature such that a CLEC can receive the revenue for the feature. A further need exists for implementing the rollover feature in an ADSL/ATM bypass network.

SUMMARY OF THE INVENTION

A method and system for providing rollover service from a competitive local exchange carrier (CLEC) is disclosed. A routing table is provided which includes call reference values stored within a local bypass system. An incoming call is checked against the call reference values to determine if a call reference value of the incoming call is associated with a grouping of call reference values. The call is connected to a destination associated with a next available call reference value in the grouping using a network control system located within the local bypass system. Since the CLEC provides the service by employing the network control system, the CLEC has the capability of billing the customer directly for the rollover service.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention provides a method and system for providing a rollover feature service implemented on a competitive local exchange carrier's (CLEC's) equipment. By employing a routing table or matrix of phone numbers, a rollover feature service can be implemented using a network control system (NCS) of the CLEC, preferably in a voice over DSL (VoDSL) system. Advantageously, by employing NCS hardware and software, rollover services may be provided to customers by CLECs, which can charge the customers for the service. In preferred embodiments, digital subscriber line (DSL)/asynchronous transfer mode (ATM) systems may be employed to implement the present invention. In one embodiment, asymmetric DSL (ADSL) is employed.

It should be understood that the elements shown in the FIGS. may be implemented in various forms of hardware, software or combinations thereof. Preferably, these elements are implemented in hardware on one or more appropriately programmed general-purpose devices, which may include a processor, memory and input/output interfaces. Elements related to routing tables are preferably implemented in software on one or more appropriately programmed general-purpose devices, which may also include a processor, memory and input/output interfaces.

Figure 1:
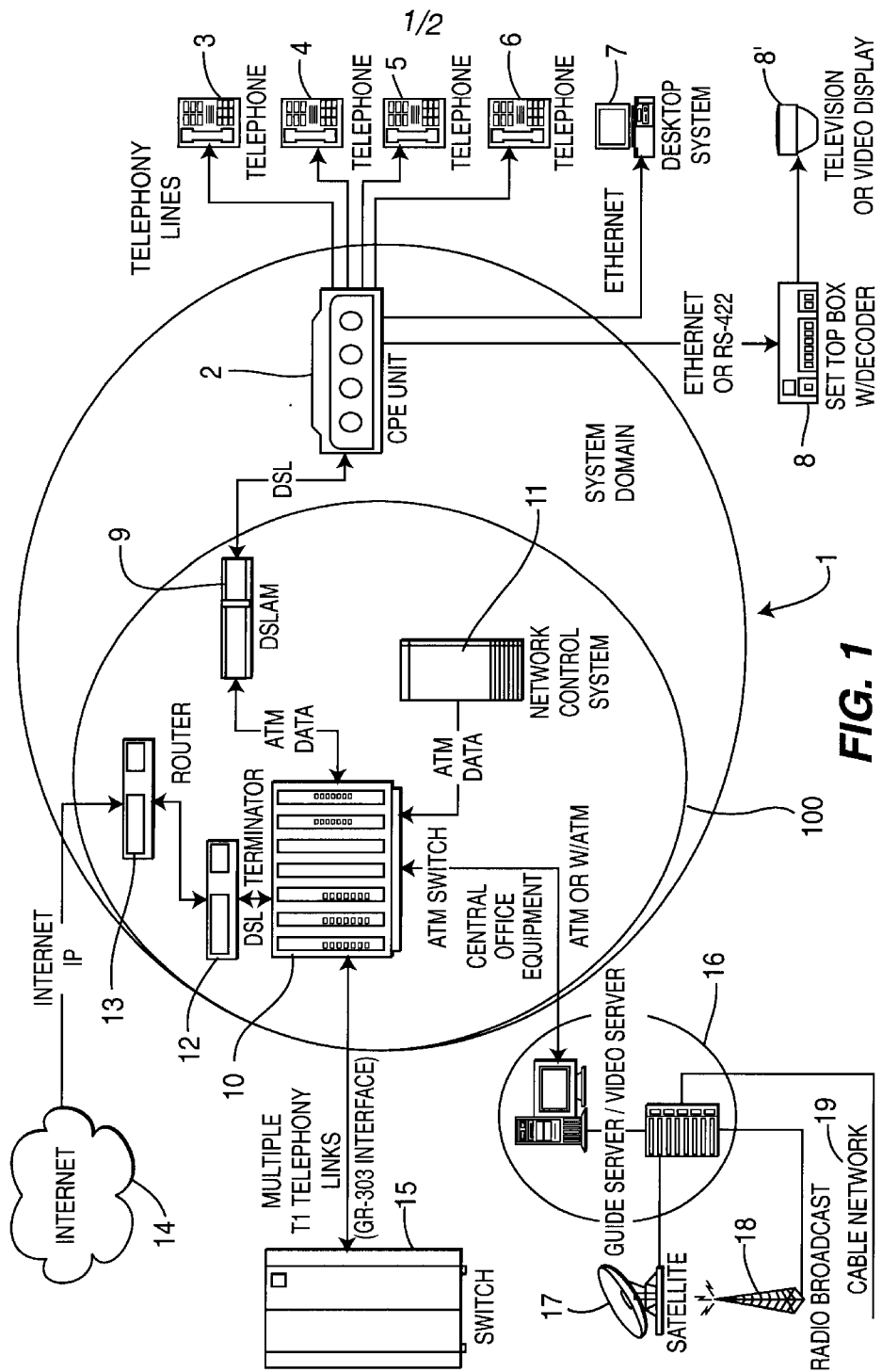
FIG. 1 is an exemplary digital subscriber line (DSL) system architecture showing a local service bypass system capable of offering rollover services in accordance with the present invention.

Referring now in specific detail to the drawings in which like reference numerals identify similar or identical elements throughout the several views, and initially to FIG. 1, a DSL system architecture 1 for integrating voice, data and video services is shown. System architecture 1 is presented as an exemplary DSL environment for employing the inventive method and apparatus in accordance with the present invention. The system block diagram 1 is composed of several functional blocks. The system domain is composed of Central Office (CO) Equipment 100 and Customer Premise Equipment (CPE). CO 100 preferably includes a competitive local exchange carriers (CLECs) local service bypass system. The component blocks within the system domain and their respective interfaces are: customer premise equipment (CPE), Digital Subscriber Line Access Multiplexer (DSLAM) 9, an ATM switch 10, an Internet protocol (IP) router 13 and DSL terminator 12, and a network control system (NCS) 11.

One illustrative set-up for customer premise equipment (CPE) 2 includes, for example, a DSL modem unit that interfaces with analog telephones (for example, analog telephones 3, 4, 5 and 6) employing plain old telephone service (POTS), a 10Base-T Ethernet connection to a PC desktop system 7, and an Ethernet or RS-422 connection to a set-top box with a decoder 8 for connection to, for example, a television or video display 8'. From the customer's analog end, the CPE device 2 accepts the analog input from each of the telephones 3–6 converts the analog input to digital data, and packages the data into ATM packets (POTS over ATM), with each connection having a unique virtual channel identifier/virtual path identifier (VCI/VPI). Known to skilled artisans, an ATM is a connection-oriented protocol and as such there is a connection identifier in every cell header, which explicitly associates a cell with a given virtual channel on a physical link. The connection identifier includes two sub-fields, the virtual channel identifier (VCI) and the virtual path identifier (VPI). Together these identifiers are used for multiplexing, demultiplexing and switching a cell through the network. VCIs and VPIs are not addresses, but are explicitly assigned at each segment link between ATM nodes of a connection when a connection is established, and remain for the duration of the connection. When using the VCI/VPI, the ATM layer can asynchronously interleave (multiplex) cells from multiple connections.

The Ethernet data is also encapsulated into ATM cells with a unique VPI/VCI. The ATM cell stream is sent to the DSL modem to be modulated and delivered to the DSLAM unit 9.

Going in the other direction, the DSL signal is received and demodulated by the DSL modem in the customer premise equipment 2 and delivered to VPI/VCI detection processing. The ATM cell data with VPI/VCI matching that of the end user's telephone is then extracted and converted to analog POTS to be delivered to the telephone. The ATM cell data with VPI/VCI matching that of the end user's Ethernet is extracted and delivered to an Ethernet transceiver for delivery to the port.

The Digital Subscriber Line Access Multiplexer DSLAM 9 demodulates data from multiple DSL modems and concentrates the data onto the ATM backbone network for connection to the rest of the network. That DSLAM provides back-haul services for package, cell, and/or circuit based applications through concentration of the DSL lines onto ATM outputs to the ATM switch 10.

The ATM switch 10 is the backbone of the ATM network. The ATM switch 10 performs various functions in the network, including cell transport, multiplexing and concentration, traffic control and ATM-layer management. Of particular interest in the system domain 100, the ATM switch provides for the cell routing and buffering in connection to the DSLAM, network control system 11 and the Internet gateway (Internet Protocol IP router 13 and DSL terminator 12), and T1 circuit emulation support in connection with the multiple telephony links switch 15. A T1 circuit provides, for example, 24 voice channels packed into a 193 bit frame transmitted at 8000 frames per second. The total bit rate is 1.544 Mbps. The unframed version, or payload, includes 192 bit frames for a total rate of 1.536 Mbps.

The ATM switch 10 is shown coupled to a program guide server/video server 16 to satellite 17, radio broadcast 18 or cable 19 networks. The ATM switch 10 is also coupled over the DSL terminator 12 and IP router 13 pair to receive Internet Protocol IP packet data from the Internet 14.

The network control system 100 provides for address translation, demand assignment and call management functions. The Network Control System's principle function is to manage the DSL/ATM network including the origination and termination of phone calls, e.g., provisioning and routing calls. The NCS is essentially the control entity communicating and translating control information between a class 5 PSTN switch (using e.g., the SS7 or GR-303 protocols) and the CPE. The network control system 100 is available for other functions such as downloadable code to the CPE, and bandwidth and call management (e.g., busy) functions, as well as other service provisioning and set up tasks.

A GR-303 (FIG. 1) is an interface between a local digital switch (LDS) 10 and systems that provide network access to local loop telephone subscribers. These systems are called integrated loop carriers (IDLCs). The GR-303 defines Interface Groups (IG). The IGs can have up to 28 DS1s, and have at least a minimum of 2 DS1s. A traffic aggregation interface for up to 2048 subscribers is defined per GR-303 Interface Group. The primary DS1 on a GR-303 Interface Group carries two channels of control information on DS0 channels. Channel twelve and twenty-four are used for this purpose. Channel twelve is used for the timeslot management channel (TMC) and channel twenty-four is used for the embedded operations channel (EOC). Two other DS0s are also used for redundancy on the other DS1. The Timeslot Management Channel (TMC) is used for managing the timeslots (DS0s) on the DS1 links. For example, if an incoming call is detected by the telephone switch, it will signal this on the TMC channel and also indicate the DS0 that the incoming telephone call is on.

The data carried in the TMC indicates a Call Reference Value (CRV) that maps to a telephone number and also indicates the DS0 that has been allocated for the call. The Timeslot Management Channel (TMC) and the Embedded Operations Channel (EOC) will be setup on PVCs between the incoming DS1 links and NCS 11 used in the ATM/ADSL head-end system. There will be two TMC and EOC channels per defined GR-303 Interface Group (IG).

System 1 may provide a local service bypass service. This means that system 1 permits a CLEC to bypass the local service of an ILEC. Since ADSL/ATM local service bypass system includes NCS 11 that is responsible for provisioning and for call routing, NCS 11 is preferably employed to route an incoming call based on a rollover routing table maintained by the NCS 11 in accordance with the present invention. NCS 11 receives information on the destination phone number from the CO Control Protocols (e.g., SS7 or GR303). Advantageously, NCS 11 tracks when the destination phone line is busy since it keeps track of the state of the calls for all phone numbers that NCS 11 provisions.

Figure 2:
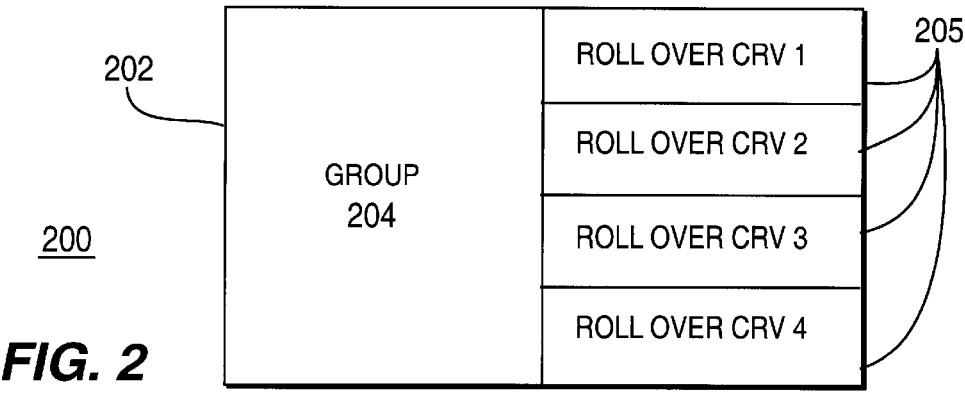
FIG. 2 is a block diagram of a rollover routing table in accordance with the present invention.

Referring to FIG. 2, a block diagram is shown for an illustrative rollover service routing table 200. Table 200 is preferably stored in a database in NCS 11. However, table 200 may be stored in other places within the network as well. An illustrative entry 202 in routing table 200 includes an association of a group 204 (or main telephone number) to a plurality of call reference value rollover numbers 205. Advantageously, since NCS 11 maintains and provisions all call routing, rollover number usage is known and software is preferably employed by NCS 11 to redirect calls made to group 204 to the next available call reference value rollover number 205. FIG. 2 illustratively shows 4 rollover CRVs. Different numbers of CRVs are also contemplated.

By employing NCS 11, which exists within the domain of the CLEC, rollover services can be charged directly to the customer from the CLEC without going through an ILEC.

Figure 3:
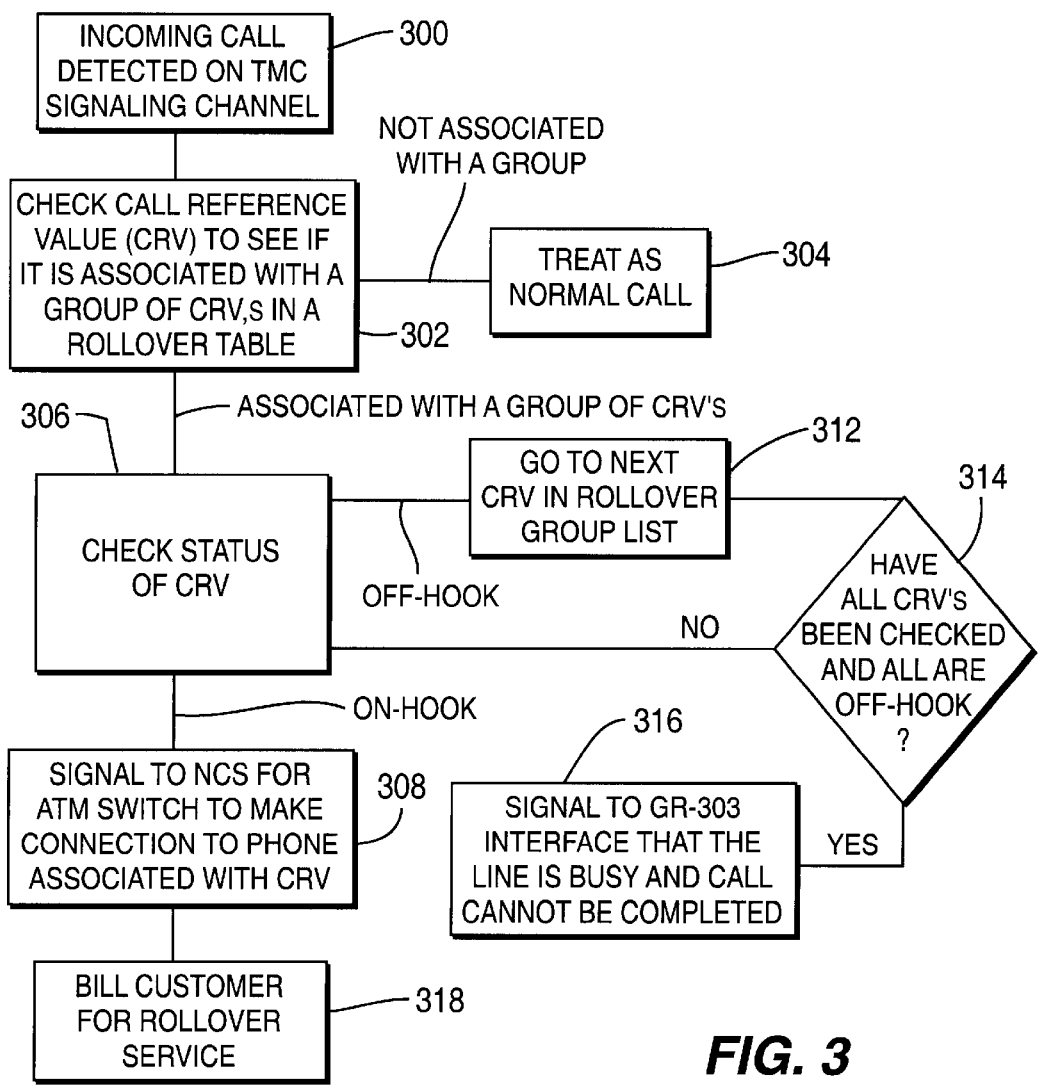
FIG. 3 is a flow/block diagram showing an illustrative rollover process implemented from a network control system of a competitive local exchange carrier (CLEC) in accordance with the present invention.

Referring to FIG. 3 with continued reference to FIG. 1, a block/flow diagram illustrating a rollover feature in an ATM/DSL based system is shown in accordance with the present invention. In block 300, an incoming call is detected on a time slot management channel (TMC) of e.g., the GR-303 protocol. In block 302, a call reference value (CRV) is checked to determine if the CRV is associated with a group of CRV's in a rollover table. The rollover table is preferably provided in a network control system (NCS 11). If the CRV is not associated with a group of CRV's then the call is treated as a normal call in block 304.

If the CRV is associated with a group of CRV's, the status of the CRV is checked in block 306 to determine if the CRV is available or not. The status is preferably checked by NCS 11, which checks the status of all of the lines NCS 11 provisions. If the CRV is on-hook, a signal is sent to NCS 11 for ATM switch 10 to make a connection to the phone associated with the CRV in block 308. Otherwise, if the phone associated with the CRV is off-hook, the program goes to the next number in the CRV group list in block 312 until an available CRV is found. In block 314, if all of the CRVs in the group have been checked and all are off-hook, than the program signals the switch 15 to indicate that the line is busy and the call cannot be completed in block 316.

In block 318, advantageously, in accordance with the present invention the CLEC provides the rollover service to the customers directly. Since the CLEC can provide the rollover service, the CLEC can bill the customers for the service.

Having described preferred embodiments for telephone line rollover service for ATM/ADSL based systems (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for providing rollover service from a competitive local exchange carrier (CLEC), comprising the steps of:
   providing a routing table including call reference values stored within a local bypass system;
   checking an incoming call against the call reference values to determine if a call reference value of the incoming call is associated with a grouping of call reference values; and
   connecting the call to a destination associated with a next available call reference value in the grouping using a network control system located within the local bypass system.

2. The method as recited in claim 1, wherein the step of providing a routing table including call reference values stored within a local bypass system includes providing the routing on a network control system located at a central office.

3. The method as recited in claim 1, wherein the local bypass system employs asynchronous transfer mode (ATM) digital service.

4. The method as recited in claim 1, wherein the step of connecting includes the step of signaling an asynchronous transfer mode (ATM) switch to connect to a telephone associated with the next available call reference value.

5. The method as recited in claim 1, wherein the step of providing a routing table includes providing a grouping number having a plurality of call reference values associated with the grouping number.

6. The method as recited in claim 1, further comprising the step of checking the status of each telephone line associated with the call reference values in the grouping by employing a network control system.

7. The method as recited in claim 6, further comprising the step of checking the status of each telephone line associated with the call reference values in the grouping by employing a network control system.

8. The method as recited in claim 1, further comprising the step of billing customers for the rollover service by the CLEC.

9. A system for providing rollover service from a competitive local exchange carrier (CLEC), comprising the steps of:
   a network control system which routes and provisions resources for completing calls through a local bypass network of a CLEC;
   a routing table stored on the network control system, the routing table including stored call reference values;
   the network control system for checking an incoming call against the call reference values to determine if a call reference value of the incoming call is associated with a grouping of call reference values, and for connecting the call to a destination associated with a next available call reference value in the grouping.

10. The system as recited in claim 9, wherein the step of providing a routing table includes call reference values stored within a local bypass system located at a central office of the CLEC.

11. The system as recited in claim 9, wherein the local bypass system includes an asynchronous transfer mode (ATM) digital service.

12. The system as recited in claim 9, further comprising an asynchronous transfer mode (ATM) switch which connects an incoming call to a telephone associated with the next available call reference value based on data from the network control system.

13. The system as recited in claim 9, wherein the routing table includes a grouping number entry having a plurality of call reference values associated with the grouping number.

14. The system as recited in claim 9, wherein the local bypass network includes an asynchronous digital subscriber line network.

* * * * *